US012766720B2

(12) United States Patent
Jaccoud-Miley et al.

(10) Patent No.: US 12,766,720 B2
(45) Date of Patent: Oct. 20, 2026

(54) AUTOMATED PARALLELIZED TRAJECTORY ANALYSIS

(71) Applicant: DISNEY ENTERPRISES, INC., Burbank, CA (US)

(72) Inventors: Victor Ross Jaccoud-Miley, Clermont, FL (US); Derek Christopher Haas, Hermosa Beach, CA (US); Emma Katherine Lee, Orlando, FL (US); Sarah Elizabeth Warmouth, Ocoee, FL (US); Gregory Joseph Nathan, Orlando, FL (US); Michael John Anson, Winter Garden, FL (US)

(73) Assignee: Disney Enterprises, Inc., Burbank, CA (US)

( * ) Notice: Subject to any disclaimer, the term of this patent is extended or adjusted under 35 U.S.C. 154(b) by 9 days.

(21) Appl. No.: 18/985,482

(22) Filed: Dec. 18, 2024

(65) Prior Publication Data

US 2026/0166734 A1 Jun. 18, 2026

(51) Int. Cl.
*B25J 9/16* (2006.01)

(52) U.S. Cl.
CPC .................................. *B25J 9/1664* (2013.01)

(58) Field of Classification Search
CPC ......... B25J 9/1664; G05D 3/00; G05D 13/00; G05D 15/00; G05B 9/00; G05B 19/00
See application file for complete search history.

(56) References Cited

U.S. PATENT DOCUMENTS

| | | | | |
|---|---|---|---|---|
| 10,427,305 | B2 * | 10/2019 | Atherton | G05D 1/0016 |
| 11,607,807 | B2 * | 3/2023 | Khansari Zadeh | G06N 20/00 |
| 2003/0038498 | A1 * | 2/2003 | Rajasingham | B60R 21/23138 296/68.1 |
| 2022/0001536 | A1 * | 1/2022 | Ishikawa | B25J 9/1666 |
| 2022/0105636 | A1 * | 4/2022 | Oboril | B25J 9/1676 |

* cited by examiner

*Primary Examiner* — Dalena Tran
(74) *Attorney, Agent, or Firm* — Dorsey & Whitney LLP

(57) ABSTRACT

A method for determining a trajectory of an object includes: determining, via a processing element, the object of the moving device; generating, via the processing element, a physics model of a moving device including the object; receiving, via the processing element, a motion profile of the moving device; discretizing, via the processing element, the motion profile in time into a plurality of time steps; simulating, via the processing element, a release of the object at each of the plurality of time steps; determining, via the processing element, a trajectory of the object as a result of the release.

20 Claims, 7 Drawing Sheets

AUTOMATED PARALLELIZED TRAJECTORY ANALYSIS

BACKGROUND

Moving devices and equipment (such as industrial robots, animatronic characters, vehicles, etc.) may sometimes have one or more pieces disconnect or become unassembled while in use. Such pieces may travel away from the device and land at different locations surrounding the device.

BRIEF SUMMARY

In one embodiment, a method for determining a trajectory includes: generating, via a processing element, a physics model of a moving device; determining, via the processing element, an object of the moving device; determining, via the processing element, a motion profile of the moving device; discretizing, via the processing element, the motion profile in time into a plurality of time steps; simulating, via the processing element, a release of the object from the moving device at each of the plurality of time steps; and determining, via the processing element, a trajectory of the object as a result of the release.

Optionally, in some embodiments, the method further includes generating, via the processing element, an alert based on the trajectory.

Optionally, in some embodiments, the method further includes determining an envelope for the object for the plurality of time steps, wherein the envelope includes a two-dimensional area or three-dimensional volume beyond which the trajectory of the object is unlikely to reach, for the release at each of the plurality of time steps.

Optionally, in some embodiments, the object includes a first object and a second object, and wherein the envelope includes a trajectory of the first object and a trajectory of the second object.

Optionally, in some embodiments, the object includes a first object and a second object, and the determining the trajectory of the object includes determining a trajectory of the first object and a trajectory of the second object in parallel.

Optionally, in some embodiments, the method further includes determining an energy of the object.

Optionally, in some embodiments, the method further includes determining a landing energy of the object.

Optionally, in some embodiments, the moving device includes one or more of a robot, a vehicle, or an animatronic figure.

Optionally, in some embodiments, the motion profile is at least one of predetermined, non-deterministic, based on a control policy, or random.

Optionally, in some embodiments, the plurality of time steps is determined by an adaptive process.

In one embodiment, a system for determining a trajectory including a non-transitory computer-readable storage medium, the computer-readable storage medium includes instructions that when executed by a computer, cause the computer to: generate a physics model of a moving device; determine an object of the moving device; determine a motion profile of the moving device; discretize the motion profile in time into a plurality of time steps; simulate a release of the object from the moving device at each of the plurality of time steps; and determine a trajectory of the object as a result of the release.

Optionally, in some embodiments, the instructions further cause the computer to generate an alert based on the trajectory.

Optionally, in some embodiments, the instructions further cause the computer to determine an envelope for the object for the plurality of time steps, wherein the envelope includes a two-dimensional area or three-dimensional volume beyond which the trajectory of the object is unlikely to reach, for the release at each of the plurality of time steps.

Optionally, in some embodiments, the object includes a first object and a second object, and wherein the envelope includes a trajectory of the first object and a trajectory of the second object.

Optionally, in some embodiments, the object includes a first object and a second object, and the determining the trajectory of the object includes determining a trajectory of the first object and a trajectory of the second object in parallel.

Optionally, in some embodiments, the instructions further cause the computer to determine an energy of the object.

Optionally, in some embodiments, the instructions further cause the computer to determine a landing energy of the object.

Optionally, in some embodiments, the moving device includes one or more of a robot, a vehicle, or an animatronic figure.

Optionally, in some embodiments, the motion profile is at least one of predetermined, non-deterministic, based on a control policy, or random.

Optionally, in some embodiments, the physics model includes at least one of: a kinematics component, a statics component, a dynamics component, a material properties component, an energy component, a control component, or an environmental component.

DETAILED DESCRIPTION

Various embodiments include determining a variety of possible landing locations and optionally trajectories for components within a system. Such systems are typically systems with at least one movable component, such as a robotic arm with sheathing or other elements attached thereto. The system enables determination of a range of possible trajectories and landing locations. One or more portions of the moving device, either whole parts or assemblies or pieces of the same, are selected for inclusion in a track or motion profile. A motion profile for the moving device is determined (e.g., a predetermined path or a possible movement based on mechanical constraints) and is combined with potential decoupled objects, their location on the device, and a physics model. The motion profile is discretized across a period of time (e.g., from an initial movement position to an ending position), typically in time steps less than a second or other intervals dependent on the length or other characteristics of the motion. At each time step, a release of the decoupled object is simulated and a trajectory of the object is followed until the object comes to rest or until the object reaches a predetermined location such as a floor, wall, or nearby object. A map or other identification of possible landing locations, as well as trajectories to those locations, may be generated. In some embodiments, the systems generate a perimeter or travel envelope for the moving device (e.g., an area or volume within which an ejected object has the potential to land).

Figure 1:
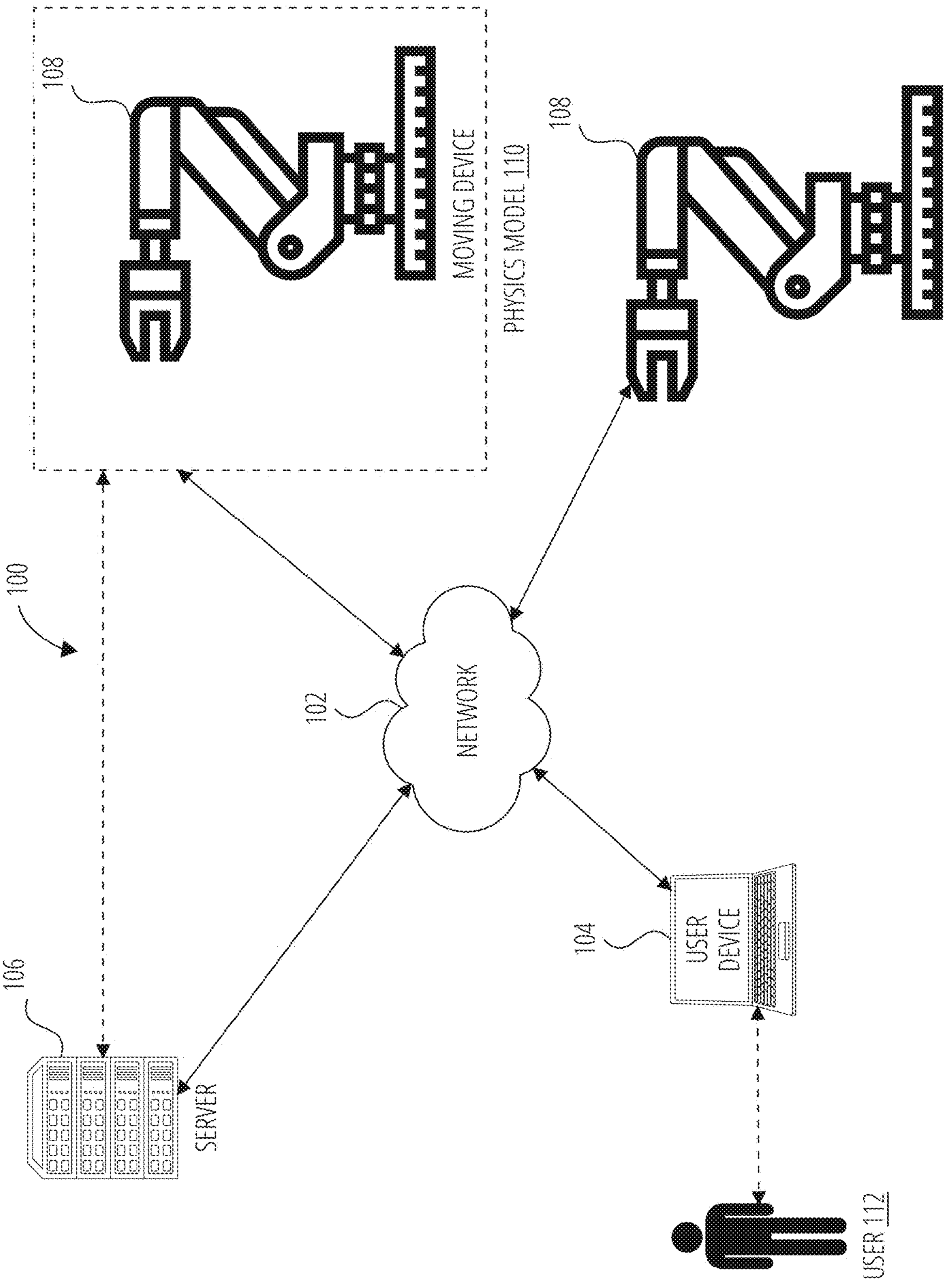
FIG. 1 is a schematic of an example of a system suitable for simulating a trajectory of an object.

FIG. 1, a schematic of an embodiment of a system 100 suitable for determining a plurality of trajectories of an object released from a moving device. In some embodiments, the system 100 includes a user device 104 or a server 106 that can simulate a motion profile (see., e.g., motion profile 114 of FIG. 2A) of the moving device via a physics model 110 of the moving device 108. In the example shown in FIG. 1, the moving device 108 is depicted as an industrial robot. However, the systems and methods disclosed herein are suitable for use with any type or kind of moving device.

Figure 2A:
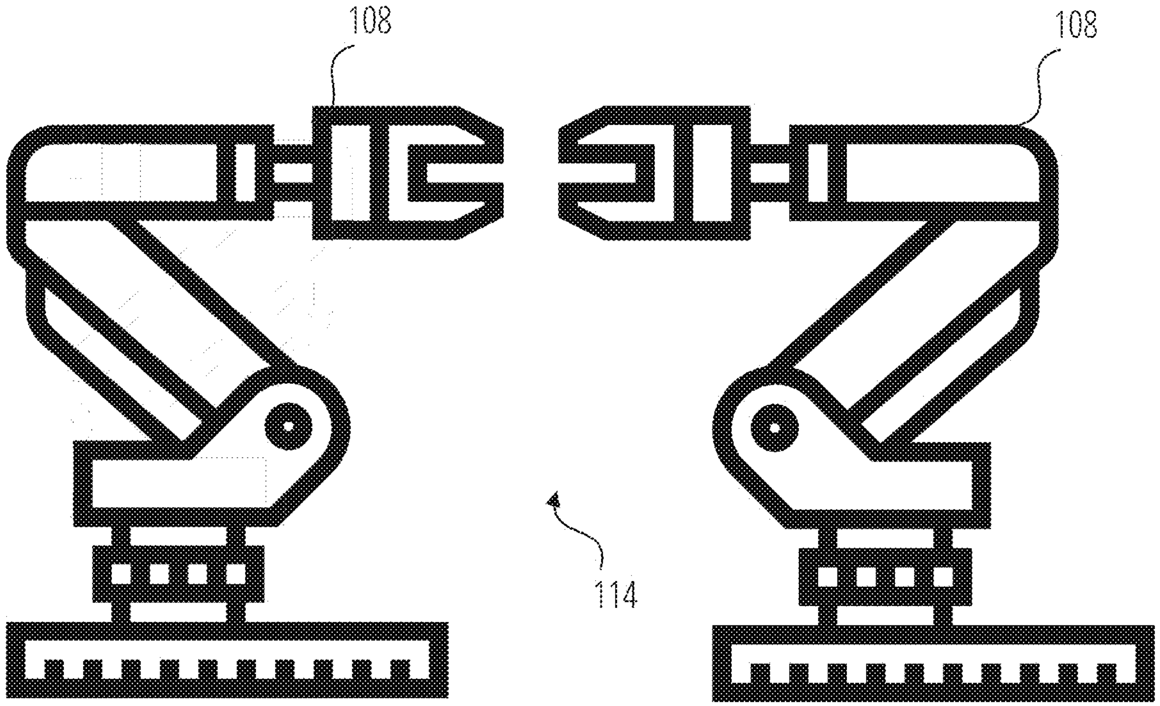
FIG. 2A is an elevation view of an example of a moving device suitable for analysis by the system of FIG. 1, in a first configuration.

FIG. 2A illustrates an example of the moving device 108 performing a motion profile. For example, in the case of an industrial robot, the motion profile may include a repetitive motion of welding panels on a car, picking electronic components for placement on a printed circuit board, etc. In some embodiments, the motion profile may be predetermined. In some embodiments, the motion profile may be based on a control policy, artificial intelligence, or machine learning algorithm. In such embodiments, the motion profile may not be predetermined (e.g., may be non-deterministic). In some embodiments, the motion profile may be a combination of predetermined and non-predetermined actions, such as when an animatronic figure includes predetermined show functions layered with non-predetermined motions such as walking.

Figure 2B:
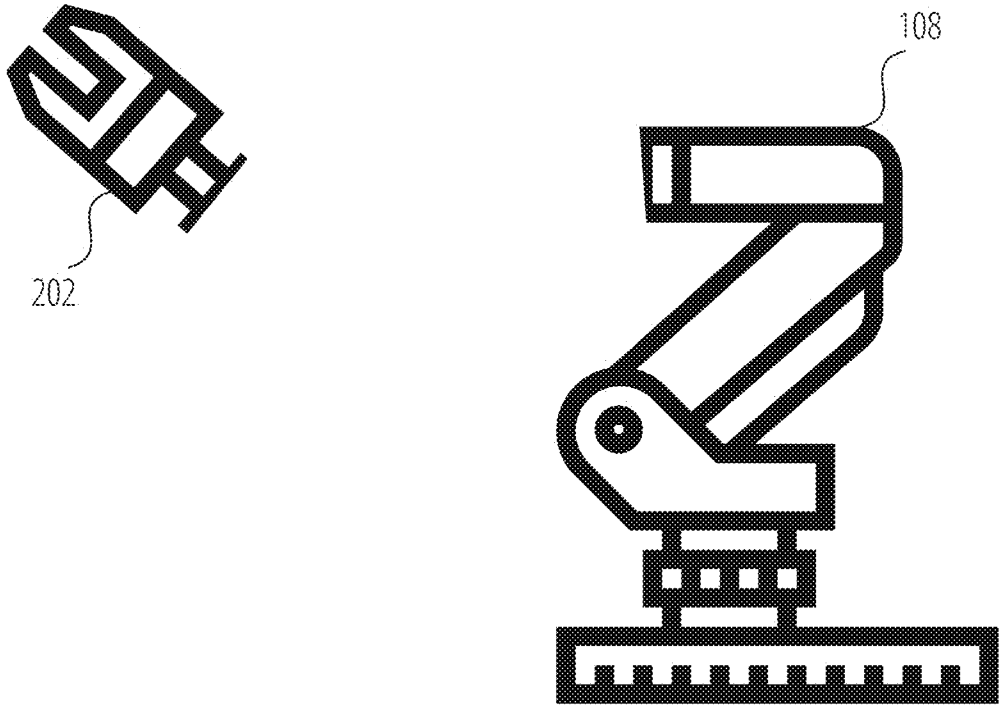
FIG. 2B is an elevation view of the moving device of FIG. 2A in a second configuration.

FIG. 2B illustrates an example of an object 202 being released from the moving device 108 during the motion profile. While the example of FIG. 2B shows an end effector of the robot being released, the object 202 may be any part, component, or sub-assembly of the moving device 108 capable of breaking free or loosening from the moving device 108. FIG. 2B may represent an actual object 202 being released from the moving device 108 or may represent a physics model 110 simulation of the object 202 being released from the moving device 108.

Figure 3:
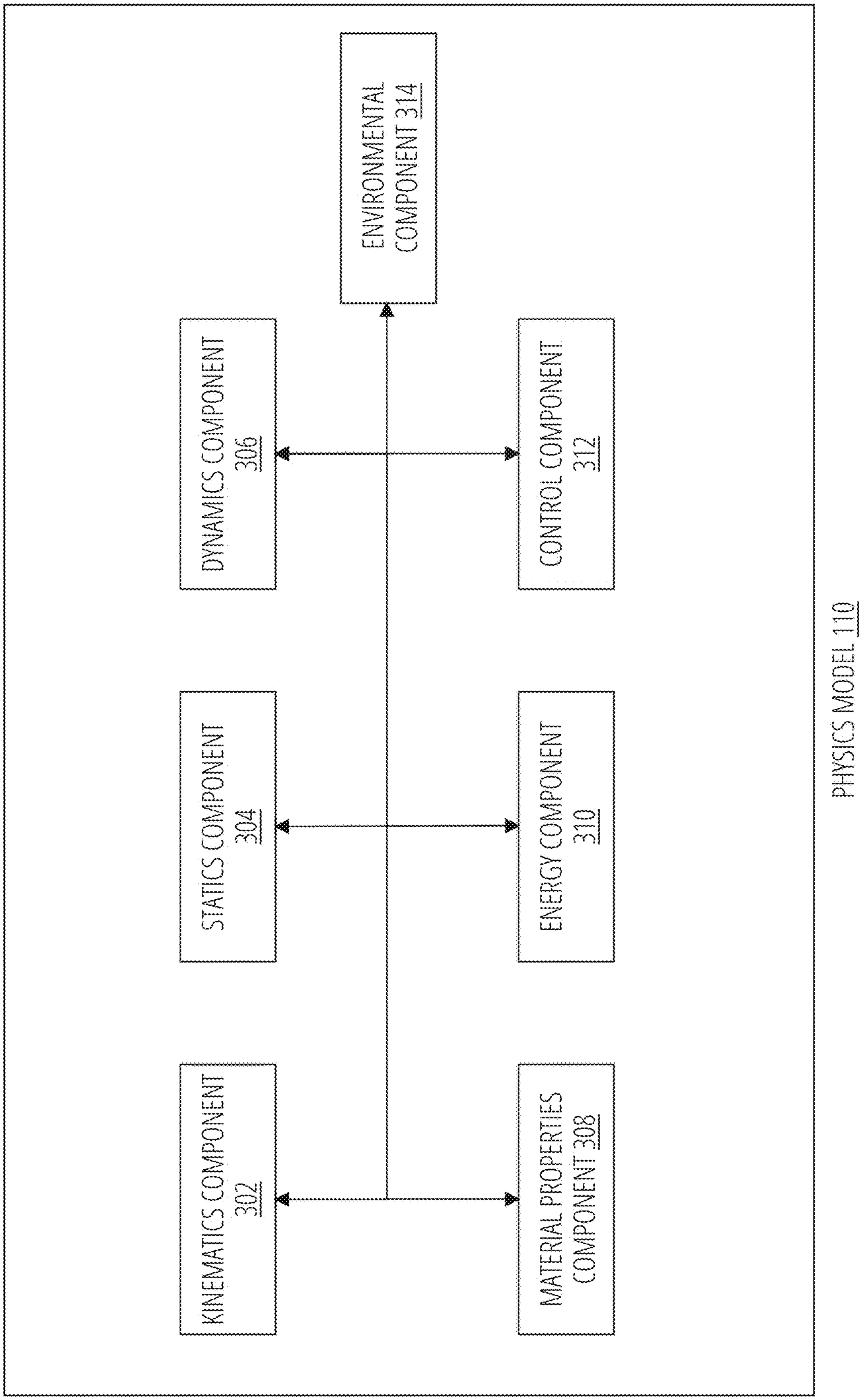
FIG. 3 is a simplified block diagram of examples of components of a physics model of the system of FIG. 1.

FIG. 3 is a simplified block diagram showing examples of components that may be used in the physics model 110. In some embodiments, a physics model 110 of a moving device 108 includes one or more components that collectively or individually describe and influence the function and motion of the moving device 108 in a simulated motion profile. In many embodiments, the physics model 110 includes different discrete or interconnected components such as a kinematics component 302, a statics component 304, a dynamics component 306, a material properties component 308, an energy component 310, a control component 312, and/or and environmental component 314, etc. One or more of these components of the physics model 110 may be optional in some embodiments.

In some embodiments, the physics model 110 may include a kinematics component 302 that simulates geometric aspects of motion, including the position, velocity, and/or acceleration of parts and components of the moving device 108 without inclusion of the forces involved in generating the kinematic effects. For example, a kinematics component 302 may evaluate the motion of rigid bodies and/or joints therebetween in the moving device 108, such as motion of a linkage.

In some embodiments, the physics model 110 may include a statics component 304 that simulates equilibrium between forces so parts of the moving device 108 remain stationary or have a constant velocity in the simulated motion profile.

In some embodiments, the physics model 110 may include a dynamics component 306 that simulates the forces, torques, and reactions of the parts of the moving device 108 such as when the parts of the moving device 108, or the moving device 108 itself, are accelerating or decelerating. In some embodiments, the physics model 110 applies Newton's laws of motion to simulate the motion profile of the moving device 108 in the dynamics component 306.

In some embodiments, the physics model 110 may include a material properties component 308 that simulates material properties of the moving device 108. Materials affect aspects of the moving device 108, such as strength, flexibility, and longevity, etc. For example, when the physics model 110 includes both a dynamics component 306 and a material properties component 308, the physics model 110 can calculate the fracture, failure, or fatigue of parts of the moving device 108, and as such, can determine what objects are likely to be released from the moving device 108 during a motion profile.

In some embodiments, the physics model 110 may include an energy component 310 that simulates energy sources that move the moving device 108 or parts thereof. For example, the energy component 310 can simulate the motion, forces, energy, power, etc. of motors, actuators, or other sources of supplied or stored energy, and their effects on the motion profile of the moving device 108.

In some embodiments, the physics model 110 may include a control component 312 that simulates control systems of the moving device 108. For example, the control component 312 may include or simulate algorithms or control policies used to control motion of the moving device 108 and the effects of the same on the motion profile.

In some embodiments, the physics model 110 may include an environmental component 314 that can simulate forces imposed by the environment on the moving device 108, such as resistance forces, like friction and air resistance, and/or forces like gravity. In some embodiments, the environmental component 314 may simulate the effects of ambient conditions such as temperatures (e.g., heat or cold), precipitation like rain, snow, etc., wind, flooding, and/or seismic events on the motion profile of the moving device 108. In some embodiments, the environmental component 314 can simulate objects in the environment other than the moving device 108, such as walls, floors, structures, obstacles, furniture, different ground properties such as tile, concrete, sand, water, gravel, asphalt, etc.

Figure 4:
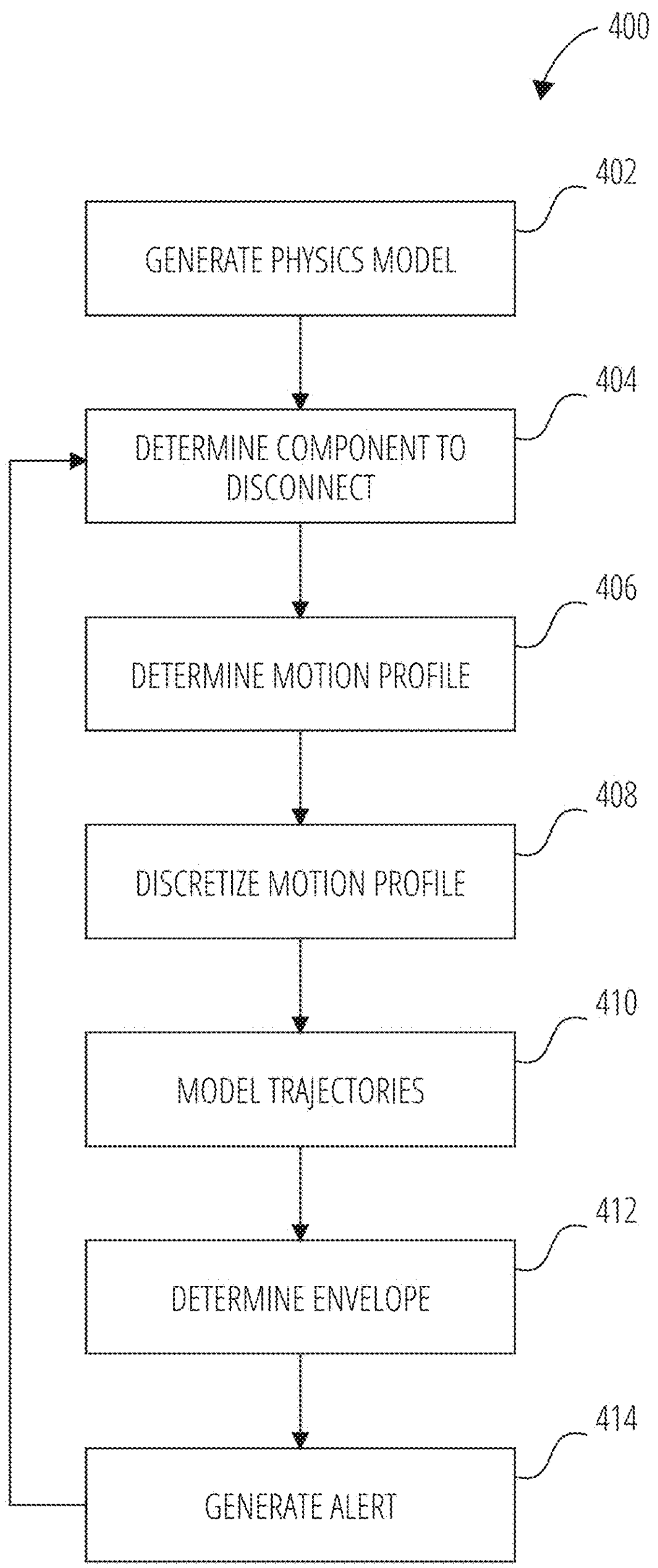
FIG. 4 is an example of a method of simulating a trajectory of an object with the system of FIG. 1.

FIG. 4 illustrates an example method 400 for determining a plurality of trajectories of an object releasable from a moving system. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence. In some examples, one or more operations may be optional (e.g., the operation 414 to generate an alert). In many embodiments, the system 100 may automatically perform one or more operations of the method 400 on one or more components (even substantially all of the components) of a moving device 108.

According to some examples, the method 400 includes generating a physics model 110 at operation 402. For example, a user device 104 or a server 106 of the system 100 may include a solid model of the moving device 108 along with one or more of the components of the physics model 110 (e.g., as described with respect to FIG. 3).

According to some examples, the method 400 includes determining an object 202 whose release from the moving device 108 is to be simulated, at operation 404. In some embodiments, a user 112 may select an object 202 for analysis by the system 100 via the method 400. In some embodiments, the system 100 may select an object 202 automatically. For example, in the operation 404, the system 100 may select an object 202 from a list of possible objects 202 in the moving device 108. For example, the system 100 may select the object 202 from a bill of materials of the moving device 108. In some embodiments, the system 100 may sequentially select each component of the moving device 108 in subsequent executions of the method 400 until all, or substantially all of the components of the moving device 108 have been simulated. In some embodiments, the object 202 may be selected randomly. In some embodiments, the object 202 may be selected by the system 100 based on a simulation of stresses or likely failure of an object 202 (e.g., from a prior execution of the method 400). In some embodiments, the system 100 may simulate multiple (up to and including all) parts of the moving device 108 substantially in parallel. For example, a processing element 702 (discussed in more detail with respect to FIG. 7) may be a parallel processor such as a graphics processing unit with multiple cores that can rapidly simulate multiple trajectories of multiple objects 202 at the same, or substantially the same time.

According to some examples, the method 400 includes determining a motion profile at operation 406. In some embodiments, the method 400 may determine the motion profile based on one or more of the components of the physics model 110, such as a kinematics component 302, a statics component 304, a dynamics component 306, a material properties component 308, an energy component 310, a control component 312, and/or and environmental component 314. The motion profile defines the likely or estimated motions of the moving device 108 and its constituent parts as a function of time (e.g., either a plurality of discrete points in time or as a continuous or partially continuous function of time). Returning to the example of the industrial robot, the motion profile may be a repetitive path for the robot (e.g., as programmed by geometric code or g-code) as it goes about its work. In other examples, the motion profile may be non-deterministic in that the motion profile can vary within certain parameters from one execution of the method to the next. For example, in the case of an autonomous or semi-autonomous robot, the motion profile may vary between executions of the method 400 even for the same, or similar, starting conditions. Furthermore, the motion profile of an autonomous robot may vary based on the environmental component 314, such as when encountering obstacles, different ground surfaces, etc.

According to some examples, the method 400 includes discretizing the motion profile at operation 408. For example, the system 100 may sample the motion profile at one or more discrete points in time from (and including) a beginning of the motion profile to (and including) an end of the motion profile. In some embodiments, the discrete points may be evenly spaced in time.

In some embodiments, the discrete points may be determined by an adaptive process where the discrete time points may not be evenly spaced in time. For example, in portions of the motion profile where the moving device 108 experiences high accelerations or other rapid changes in position, velocity, orientation, etc., the system 100 may sample the motion profile more frequently than in portions of the motion profile with relatively lower accelerations, etc. Benefits of this adaptive discretizing approach may be increased simulation fidelity while also balancing the use of computing resources by not over-sampling during relatively slow or low acceleration motions.

According to some examples, the method 400 includes simulating trajectories at operation 410. In some embodiments, the system 100 uses the physics model 110 to simulate motion of the object 202 after being disconnected from the moving device 108, at each point of the motion profile sampled in operation 408. In some embodiments, the operation 410 may be executed for each of the discrete sampled points in time, substantially in parallel. For example, a processing element 702 (discussed in more detail with respect to FIG. 7) may be a parallel processor such as a graphics processing unit with multiple cores that can rapidly simulate the trajectories of the object 202 at all the points sampled in operation 408. In embodiments where the system 100 simulates multiple objects 202 (e.g., a first object and a second object) in one execution of the method 400 (e.g., as discussed with respect to the operation 404), the system 100 may simulate the trajectories of the multiple components at each of the sampled points determined in operation 408 substantially in parallel. Such parallelization of the method 400 may have the benefit of providing a user 112 the ability to rapidly iterate on different scenarios of motion profiles, moving device 108 designs, and/or environmental conditions, etc. In some embodiments, the system 100 may determine an energy of the object 202 in the operation 410. For example, the system 100 may determine a kinetic energy, potential energy, thermal energy, or the like, of the object 202. In some embodiments, the system 100 may determine a landing energy of the object 202 at a landing location 502 (see, e.g., FIG. 5 and FIG. 6 and related description).

According to some examples, the method 400 includes determining a map or an envelope at operation 412. As used herein, an envelope is either an area (e.g., in two dimensions) or volume (e.g., in three dimensions) beyond which an object 202 trajectory (see, e.g., sample trajectories 602 in FIG. 6) is unlikely to reach for any release point or sampled time point along the motion profile. As shown for example in FIG. 5, the system 100 may generate a two-dimensional envelope 500 that encompasses the possible landing locations of an object 202 whose trajectory is simulated in the method 400. In another example, the system 100 may generate a three-dimensional envelope 600 based on three-dimensional trajectories and/or landing locations, as shown for example in FIG. 6.

According to some examples, the method 400 includes generating an alert at operation 414. For example, the system 100 may generate a message related to one or more trajectories of one or more objects 202, such as the example visual outputs of the envelopes 500/600, landing locations 502 and/or trajectories 602. In some examples, the alert may be generated based on a comparison of an envelope 500/600 with regions or objects of interest (e.g., an object 116 shown in FIGS. 5 and 6, described herein).

Figure 5:
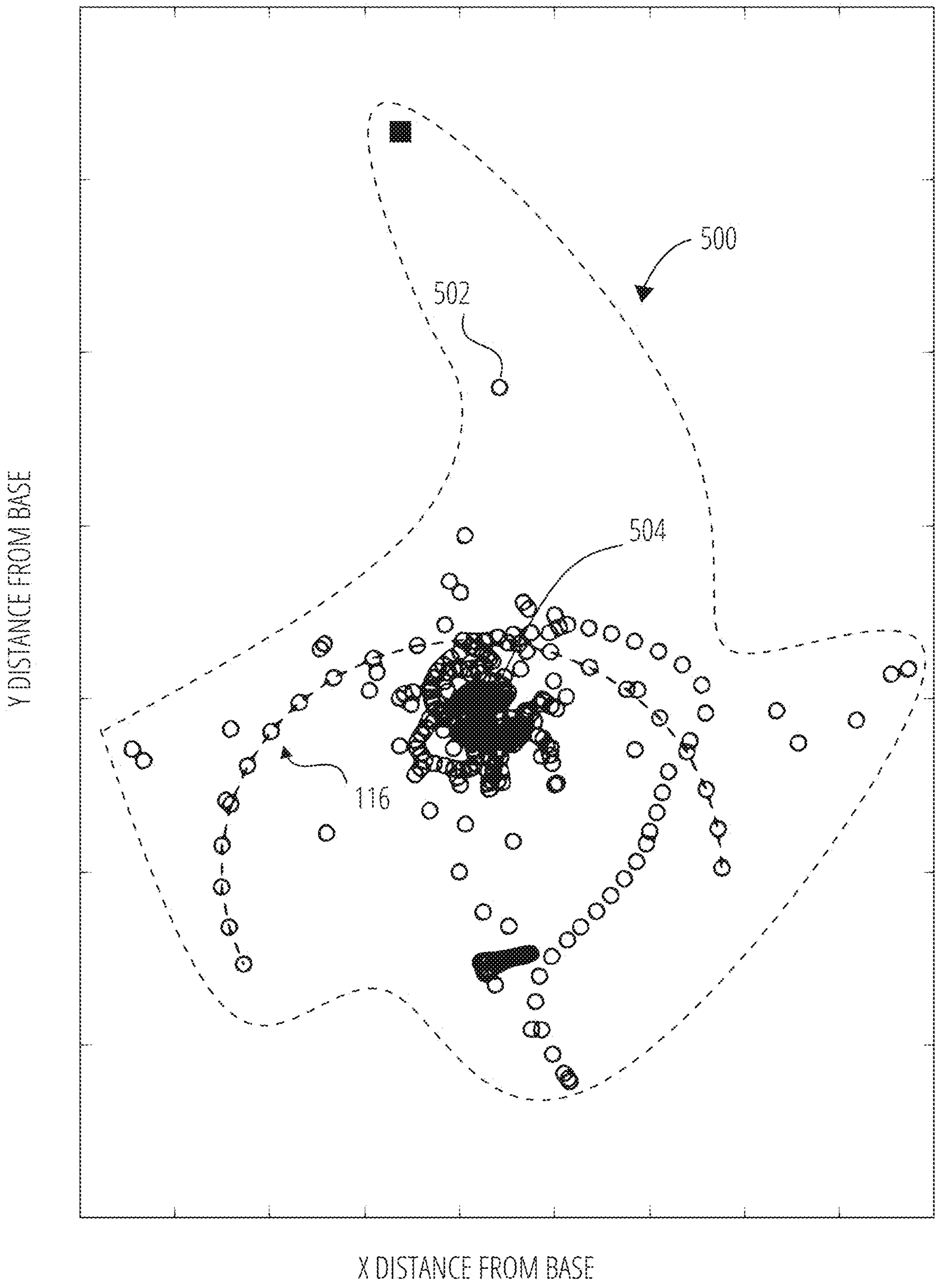
FIG. 5 is an example of landing positions and an envelope generated by the system of FIG. 1.

FIG. 5 is an example of a two-dimensional envelope 500. The envelope 500 shows likely landing locations 502 of an object 202 of a moving device 108 with respect to a base 504, as determined by the system 100 executing the method 400. FIG. 5. also shows an object 116 separate from the moving device 108 (e.g., an object of interest). The object 116 may be a device, area, region, building, structure, container, etc. near the moving device 108 about which data is determined related to the trajectories 602, landing locations 502, and/or envelopes 500/600 developed by the system 100. For example, the device 116 may be a nearby wall or structure and the system 100 determines data related to whether the object 116 may be affected by the released object 202.

Figure 6:
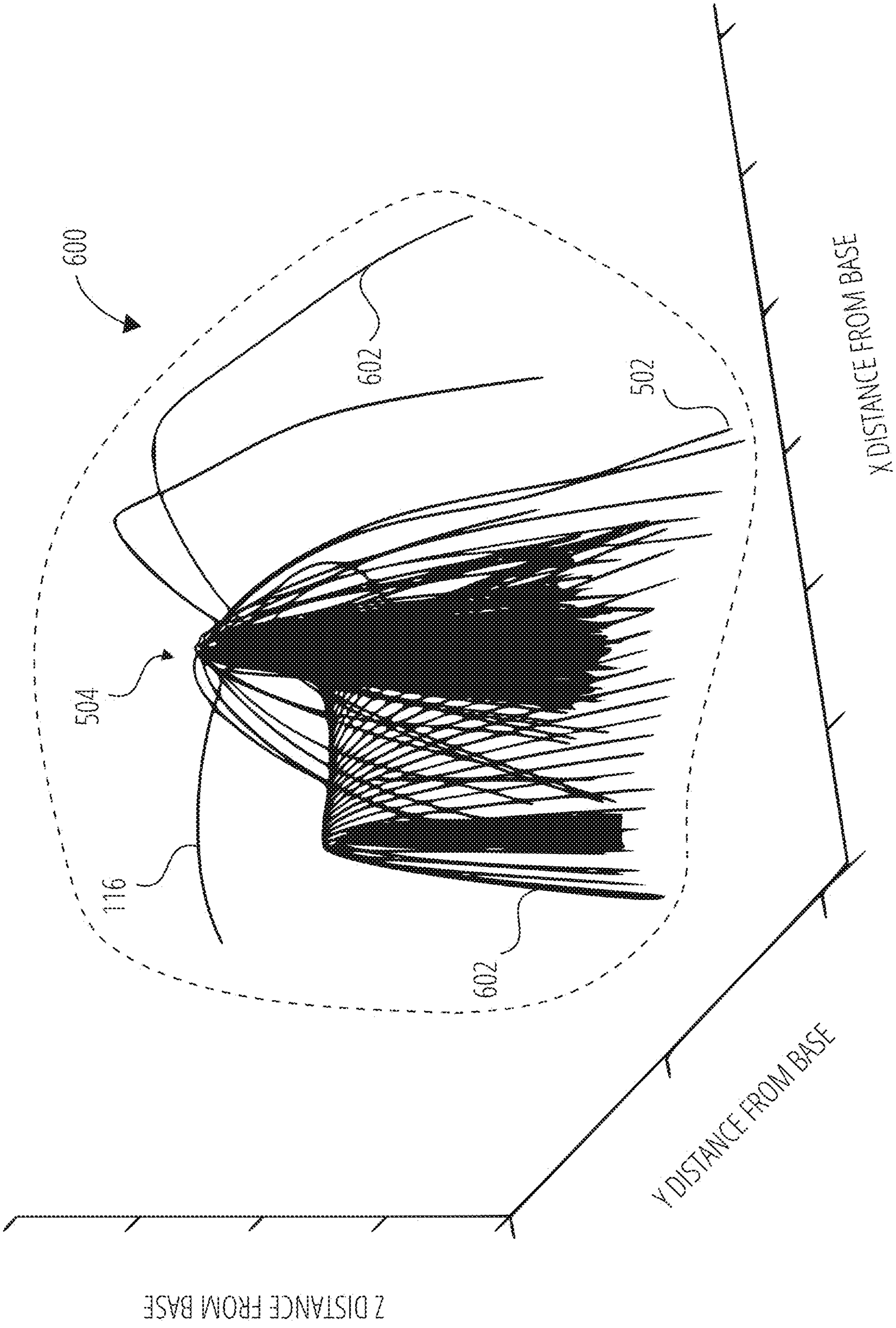
FIG. 6 is an example of trajectories and an envelope generated by the system of FIG. 1.

FIG. 6 is an example of a three-dimensional envelope 600. The envelope 600 shows likely landing locations 502 of an object 202 of a moving device 108 with respect to a base 504, as determined by the system 100 executing the method 400. FIG. 6 also shows a plurality of trajectories 602 that the object 202 would follow to respective landing locations 502, as well as the object 116.

Figure 7:
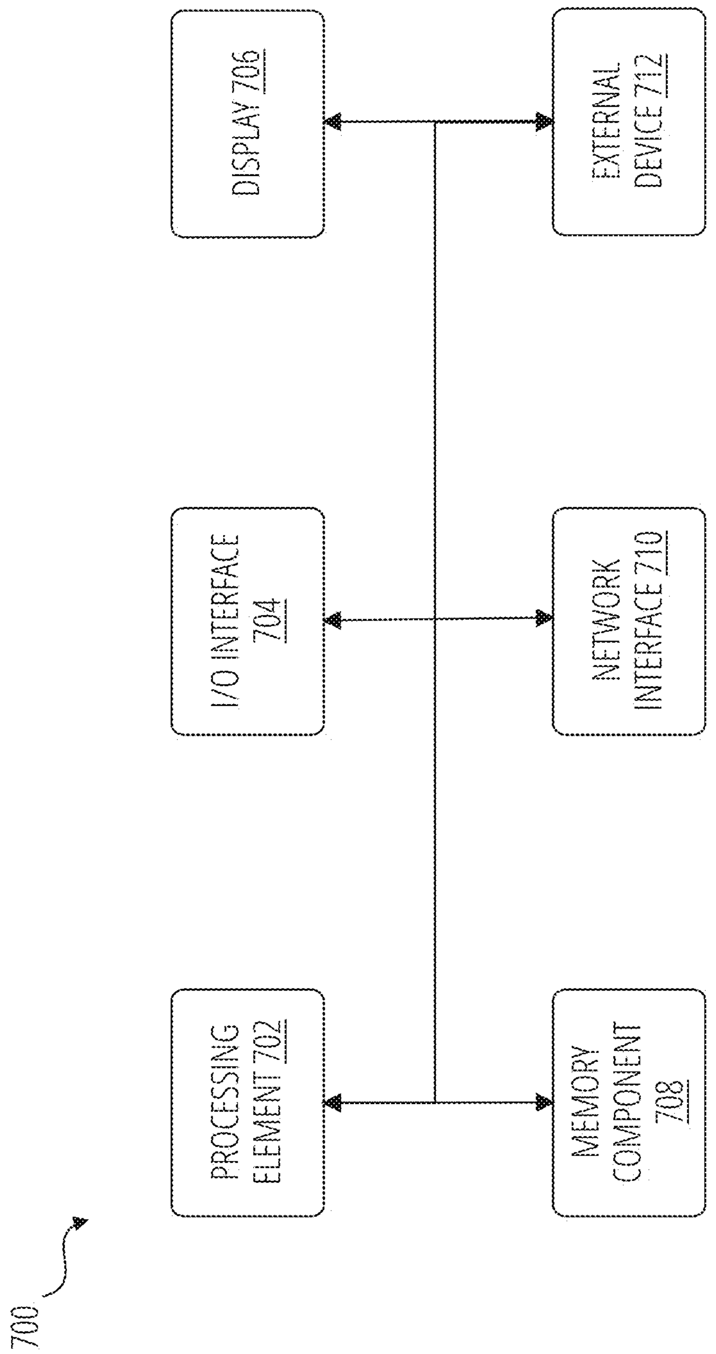
FIG. 7 is a simplified block diagram of components of a computing system of the system of FIG. 1.

FIG. 7 is a simplified block diagram of components of a computing system 700 of the system 100, such as the server 106, the user device 104, etc. For example, the processing element 702 and the memory component 708 may be located at one or in several computing systems 700. This disclosure contemplates any suitable number of such computing systems 700. For example, the server 106 or the user device 104 may be a desktop computing system, a mainframe, a blade, a mesh of computing systems 700, a laptop or notebook computing system 700, a tablet computing system 700, an embedded computing system 700, a system-on-chip, a single-board computing system 700, or a combination of two or more of these. Where appropriate, a computing system 700 may include one or more computing systems 700; be unitary or distributed; span multiple locations; span multiple machines; span multiple data centers; or reside in a cloud, which may include one or more cloud components in one or more networks.

A computing system 700 may include one or more processing elements 702, an input/output I/O interface 704, one or more external devices 712, one or more memory components 608, and a network interface 710. Each of the various components may be in communication with one another through one or more buses or communication networks, such as wired or wireless networks, e.g., the network 102. The components in FIG. 7 are exemplary only. In various examples, the computing system 700 may include additional components and/or functionality not shown in FIG. 7.

The processing element 702 may be any type of electronic device capable of processing, receiving, and/or transmitting instructions. For example, the processing element 702 may be a central processing unit, microprocessor, processor, graphics processing unit, or microcontroller. Additionally, it should be noted that some components of the computing system 700 may be controlled by a first processing element 702 and other components may be controlled by a second processing element 702, where the first and second processing elements may or may not be in communication with each other.

The I/O interface 704 allows a user to enter data in to computing system 700, as well as provides an input/output for the computing system 700 to communicate with other devices or services. The I/O interface 704 can include one or more input buttons, touch pads, touch screens, and so on.

The external device 712 are one or more devices that can be used to provide various inputs to the computing systems 700, e.g., mouse, microphone, keyboard, trackpad, sensing element (e.g., a thermistor, humidity sensor, light detector, etc. The external devices 712 may be local or remote and may vary as desired. In some examples, the external devices 712 may also include one or more additional sensors.

The memory components 708 are used by the computing system 700 to store instructions for the processing element 702 such as for executing the methods disclosed herein, such as the method 400, a user interface, as well as store data such as the physics model, envelopes, user preferences, alerts, etc. The memory components 708 may be, for example, magneto-optical storage, read-only memory, random access memory, erasable programmable memory, flash memory, or a combination of one or more types of memory components.

The network interface 710 provides communication to and from the computing system 700 to other devices. The network interface 710 includes one or more communication protocols, such as, but not limited to Wi-Fi, Ethernet, Bluetooth, etc. The network interface 710 may also include one or more hardwired components, such as a Universal Serial Bus (USB) cable, or the like. The configuration of the network interface 710 depends on the types of communication desired and may be modified to communicate via Wi-Fi, Bluetooth, etc.

The display 706 provides a visual output for the computing system 700 and may be varied as needed based on the device. The display 706 may be configured to provide visual feedback to the user 112 and may include a liquid crystal display screen, light emitting diode screen, plasma screen, or the like. In some examples, the display 706 may be configured to act as an input element for the user 112 through touch feedback or the like.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present disclosure and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

All relative, directional, and ordinal references (including top, bottom, side, front, rear, first, second, third, and so forth) are given by way of example to aid the reader's understanding of the examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A method for determining a trajectory comprising:
- generating, via a processing element, a physics model of a moving device;
- determining, via the processing element, an object initially coupled to the moving device;
- determining, via the processing element, a motion profile of the moving device;
- discretizing, via the processing element, the motion profile in time into a plurality of time steps;
- simulating, via the processing element, a release of the object from the moving device at each of the plurality of time steps; and
- determining, via the processing element, a trajectory of the object as a result of the release.

2. The method of claim 1, further comprising generating, via the processing element, an alert based on the trajectory.

3. The method of claim 1, further comprising determining an envelope for the object for the plurality of time steps, wherein the envelope comprises a two-dimensional area or three-dimensional volume beyond which the trajectory of the object is unlikely to reach, for the release at each of the plurality of time steps.

4. The method of claim 3, wherein the object comprises a first object and a second object, and wherein the envelope includes a trajectory of the first object and a trajectory of the second object.

5. The method of claim 1, wherein the object comprises a first object and a second object, and the determining the trajectory of the object comprises determining a trajectory of the first object and a trajectory of the second object in parallel.

6. The method of claim 1, further comprising determining an energy of the object.

7. The method of claim 1, further comprising determining a landing energy of the object.

8. The method of claim 1, wherein the moving device comprises one or more of a robot, a vehicle, or an animatronic figure.

9. The method of claim 1, wherein the motion profile is at least one of predetermined, non-deterministic, based on a control policy, or random.

10. The method of claim 1, wherein the plurality of time steps is determined by an adaptive process.

11. A system for determining a trajectory comprising a non-transitory computer-readable storage medium, the computer-readable storage medium including instructions that when executed by a computer, cause the computer to:
- generate a physics model of a moving device;
- determine an object initially coupled to the moving device;
- determine a motion profile of the moving device;
- discretize the motion profile in time into a plurality of time steps;
- simulate a release of the object from the moving device at each of the plurality of time steps; and
- determine a trajectory of the object as a result of the release.

12. The system of claim 11, wherein the instructions further cause the computer to generate an alert based on the trajectory.

13. The system of claim 11, wherein the instructions further cause the computer to determine an envelope for the object for the plurality of time steps, wherein the envelope comprises a two-dimensional area or three-dimensional volume beyond which the trajectory of the object is unlikely to reach, for the release at each of the plurality of time steps.

14. The method of claim 13, wherein the object comprises a first object and a second object, and wherein the envelope includes a trajectory of the first object and a trajectory of the second object.

15. The system of claim 11, wherein the object comprises a first object and a second object, and the determining the trajectory of the object comprises determining a trajectory of the first object and a trajectory of the second object in parallel.

16. The system of claim 11, wherein the instructions further cause the computer to determine an energy of the object.

17. The system of claim 11, wherein the instructions further cause the computer to determine a landing energy of the object.

18. The system of claim 11, wherein the moving device comprises one or more of a robot, a vehicle, or an animatronic figure.

19. The system of claim 11, wherein the motion profile is at least one of predetermined, non-deterministic, based on a control policy, or random.

20. The system of claim 11, wherein the physics model comprises at least one of: a kinematics component, a statics component, a dynamics component, a material properties component, an energy component, a control component, or an environmental component.

* * * * *